Jan. 4, 1955  F. A. KROHM  2,698,607
WINDSHIELD WIPER FLUID MOTOR
Filed March 28, 1949  5 Sheets-Sheet 1

INVENTOR.
FRED A. KROHM
BY
Charles S. Penfold
ATTORNEY

Jan. 4, 1955 F. A. KROHM 2,698,607
WINDSHIELD WIPER FLUID MOTOR
Filed March 28, 1949 5 Sheets-Sheet 2

INVENTOR.
FRED A. KROHM
BY
Charles S. Penfold
ATTORNEY

Jan. 4, 1955 F. A. KROHM 2,698,607
WINDSHIELD WIPER FLUID MOTOR
Filed March 28, 1949 5 Sheets-Sheet 3

INVENTOR.
FRED A. KROHM
BY
Charles S. Penfold
ATTORNEY

Jan. 4, 1955  F. A. KROHM  2,698,607
WINDSHIELD WIPER FLUID MOTOR
Filed March 28, 1949  5 Sheets-Sheet 4

INVENTOR.
FRED A. KROHM
BY Charles S. Lienfeld
ATTORNEY

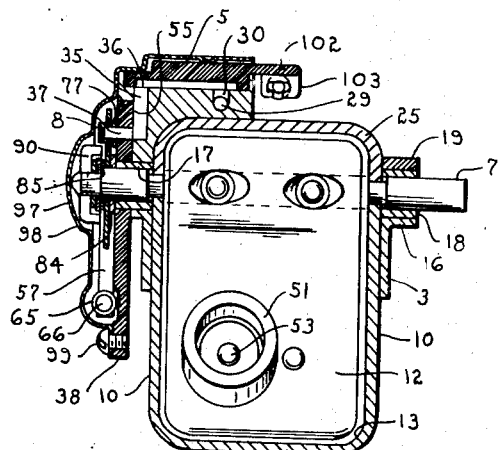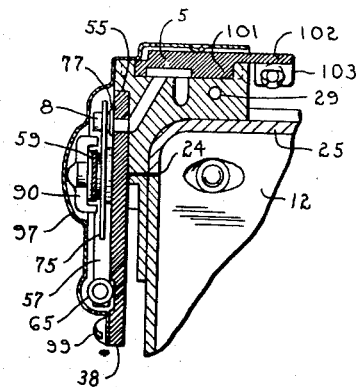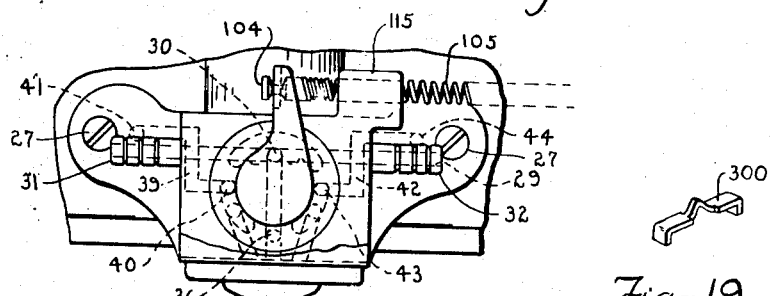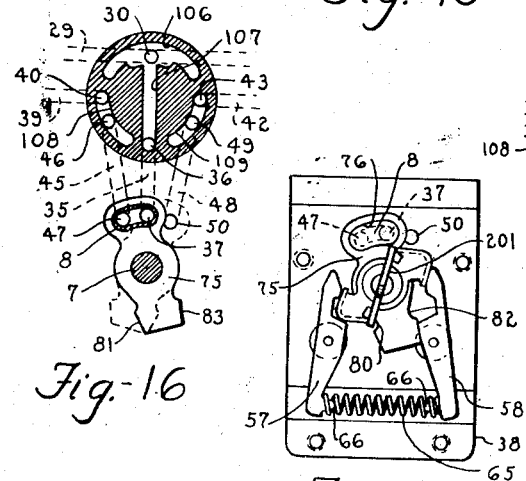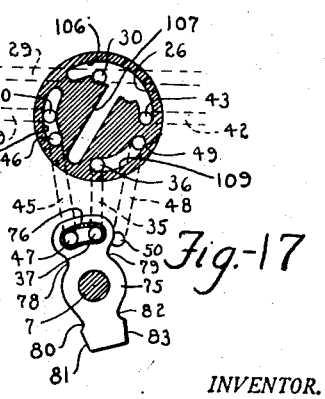
INVENTOR.
FRED A. KROHM
BY
Charles S. Penfold
ATTORNEY

United States Patent Office 2,698,607
Patented Jan. 4, 1955

2,698,607

WINDSHIELD WIPER FLUID MOTOR

Fred A. Krohm, Gary, Ind., assignor to Productive Inventions, Inc., a corporation of Indiana Application March 28, 1949, Serial No. 83,896

6 Claims. (Cl. 121—97)

This invention relates, generally to power units, and more particularly, has to do with a windshield wiper motor of the fluid type.

An object of this invention is to provide a windshield wiper motor of the fluid drive type, which may be used for replacement purposes more readily than motors heretofore available because of its embodiment of features which give it substantially universal adaptability to the widely varying dimensional limitations and other conditions encountered in replacing fluid drive motors supplied as original equipment for automotive vehicles.

Such original equipment motors, in part because of the materials and methods used in their production, and in part because of their mechanical features, deteriorate functionally in service and require replacement. Within a period much shorter than the average useful life of the automobile in which mounted such original equipment motors frequently become almost completely inoperative from such deterioration, which includes as one of its more important features, the wearing away of the material in the raceway of the reciprocal vane employed to propel the activating shaft of the motor. Such wearing away increases steadily and, as it increases, the efficiency or power of the motor decreases because of the growing proportions of leaks which occur between the vane and the raceway. Efforts to restore the efficiency of the motor by installing a new vane and/or a new resilient seal between the vane and the raceway are only partially successful. The installation of a new raceway is not practiced to any appreciable extent because of mechanical difficulties to be encountered if attempted within the scope of the facilities ordinarily available to a service station of the average type at which such replacements are made.

Another object of the invention is to provide a method of adapting a fluid driven replacement windshield wiper motor, without physical alterations in the internal moving parts thereof, to varying performance requirements of different makes and models of motor vehicles having, respectively, different constructions and arrangements of operatively connected windshield wiper arms and blades and of shafts for the actuation thereof, and having, respectively, different constructions and arrangements of linkages or other operative connections between said motor and said shafts, whereby a wiper blade impelled by said motor is parked adjacent whichever of the two extremes of its normal stroke may correspond to the original equipment practice peculiar to that particular make and model of motor vehicle.

One great impediment to the timely replacement of vacuum wiper motors for maximum driving safety is the great variety of motors required to meet the great variety of conditions inherent to different makes and models of automobiles. One of the problems encountered in providing universality in such replacement motors arises from the fact that on some makes and models of vehicles, the normal parking position of the blade is at one end of the stroke while on other vehicles it is at the other end of the stroke. Heretofore, no method has been known whereby, in a single motor, and without alterations to its internal mechanism, the operator of the motor could, selectively and at his option, with equal facility park the arms and blades adjacent either end of the stroke.

A further novel method residing in the subject invention involves the use of means controlling the application of fluid pressures selectively to one side or another of the primary impelling member of the motor to cause parking of said member and operatively related parts adjacent one or the other of the extremes of its stroke.

Other novel methods of importance in achieving useful results in the subject invention are apparent in the drawings and specification hereof.

Wear of the raceway becomes of serious proportions usefully within two or three years of usage.

As will appear hereinafter, besides the wear of the raceway, there are other important deteriorations and losses of efficiency that develop in the original equipment type of fluid drive motors (ordinarily called vacuum motors) which contribute to the necessity for replacements of the complete motor. Such original equipment motors are replaced each year in very large numbers running well into the millions of motors.

Because of frequent model changes by vehicle manufacturers, it has been necessary for the manufacturer of an original equipment fluid drive motor to vary the shape, size and dimensions of various functional parts of such motors to adapt them to a particular model of vehicle. As a result, there have accumulated over the years in the cataloging of such fluid drive motors, a very large number of models, shapes and sizes necessary for the retail service station to carry in stock in order that any substantial percentage of models of automotive vehicles requiring such service may be serviced promptly from the motor inventory on hand. It has only been practicable, heretofore, to replace such fluid drive motors with motors identical in each instance with the motor to be replaced and identical with it as to source of manufacture.

Because of the heavy and varied assortments of original equipment replacement motors required to be carried in inventory by the retail automotive outlet, comparatively few of such outlets carry any considerable range of models of replacement motors, and most automotive retail outlets carry none. Therefore, car owners are disinclined to spend the time necessary to seek out a service station able to give them prompt replacement, and are inclined to neglect such replacement, even of motors that have lost much of their efficiency, with the result that the hazards of driving, are increased not only for the owner of the particular vehicle so equipped with incompetent wiper motors but also for others.

As indicated, a purpose of the subject invention is to greatly reduce the number of motors required to be carried in retail and wholesale replacement inventories, so as to encourage and enable a much larger number of wholesalers and retailers to provide such service, to the end that driving and walking on the streets and highways will become less hazardous.

A further purpose of the invention is to provide a construction for and method of throttling the application of fluid pressures to the motor so as to facilitate control of the performance of the motor by the operator of the vehicle. For example, the manual control devices ordinarily used for starting, regulating, stopping and parking such motors are unsatisfactory in that they permit the abrupt cutting off of the fluid pressure from normal wiping operations with the result that the parking of the blade and arm often is abrupt and violent, causing slapping of the blade and/or arm against the frame of the windshield in a manner that causes them to deteriorate at an abnormally rapid rate. As will appear hereinafter, the subject invention prevents such undesirable abruptness in the control of fluid pressure and prevents the violent overthrow of the blade and arm beyond normal parking limits. The subject invention provides a throttling method and structure which promotes "cushioning" of the parking operation.

Another object of the invention is to provide a method of and structure for manual control of the throttle (which in turn controls fluid pressure) which lends itself readily to installation for replacement purposes and can be adapted, in installation, as well to one as another of the positions of the motor with relation to the control member exposed for manual contact. There are so many different positions of the exposed manual control member (exposed usually externally of the instrument panel of the automobile at a point within convenient reach of the operator's hand) relative to such a variety of intervening obstructions in the way of wires, linkages, etc. disposed in the limited space available, as to have seriously obstructed all previous efforts to provide a substantially universal replacement for such fluid drive motors. The subject invention, as will be seen, provides within practicable ranges, unlimited adaptability to these varying conditions and permits ready installation of the motor and the exposed manual control member with a connection therebetween which operates with equal and complete success regardless of the position of the motor with relation to the position of the exposed manual control member. The exposed manual control member obviously may be installed in any desired position at the top or at the front of the instrument panel, (as indicated in Figure 1). The exposed manual control member is readily adaptable, therefore, to installation in the same position as the corresponding original equipment member, without the necessity for drilling a new hole in the supporting panel.

Another purpose of the invention is to provide throttling mechanism (Figure 15) and control mechanism (Figure 2) therefor which will permit the parking of the wiper blades adjacent either end of their arcuate stroke, without any alteration in the structure, and entirely at the option of the operator of the vehicle. This feature becomes important in a replacement motor because some of the original equipment installations park normally at one end of the stroke while others park normally at the opposite end of the stroke. These opposing characteristics naturally require the use for replacement of a different model and design of motor, when replacements other than those identical with the original equipment installation are not available. Thus the invention removes one of the further and important obstructions to universality.

A further object of the invention is to remove still another obstruction to universality occasioned by the fact that such original equipment motor may have the hollow nipple over which the rubber hose is fitted extending from the motor in a given direction (toward the right-hand side of the car, for example) or on another model extending from the motor and in an opposite direction. This makes inconvenient, if not impossible, the connection of such hose with any motor having such hollow nipple on a side of the motor opposite to that from which the hose approaches the motor. The subject invention provides a novel construction and arrangement of channeling of fluid conduit which permits the attachment of said hose to either side of the motor so that, regardless of the angle of approach of the hose, it may be as readily connected to the motor as if it were identical with the original equipment motor which it replaces, which construction permits the closure of the opposite nipple by a rubber cap (as shown in Figure 2).

Another object of the invention is to provide an improved valving device for automatically alternating fluid pressure (or suction) at opposite sides of the driving vane. Ordinary devices for this purpose are bulky and require a space allowance which restricts the lateral cross-sectional dimension of the raceway of the motor, and thus restricts the over-all power of the motor. Such ordinary valve devices also involve the use of die cast parts which are costly—and are inclined, particularly after considerable wear, to develop leakage between the surfaces of relatively moving contacting members. The subject invention embodies a valving device constructed and arranged to employ much less costly punch press parts and to provide a subassembly of thinner structure which permits adding to the lateral cross-sectional dimension of the motor raceway without adding to the over-all width of the complete motor assembly. It will be noted by reference to the drawings and to the following specification, that the subject valving device creates the "flip" or throw of the valve, from one extreme position to the other, by the use of opposed identical external cams which react to a common spring, whereby the rate of wear on each of these two cams is approximately one-half of the rate of wear on a single cam if used for the purpose, and the spring pressure created by the two opposing cams is balanced so as to avoid unequal urging of the motor shaft which carries the dual-faced internal cam. The external cams may be made of cloth impregnated plastic such as commonly used elsewhere in automobile cams or levers subject to wear, thus to minimize noise of operation.

Another purpose of the invention is to provide a floating valve member responsive to fluid suction and thereby held in uniform and constant contact with the opposing face, carrying terminals of conduits, so that any tendency to create or permit leakage between the valve member and the face will be minimized.

Another object of the invention is to provide a two-ended key or cross member 90 for engagement with the motor shaft, each of said ends being constructed and arranged to contact and urge forward inner portions of the internal cam member, said cross member being readily removable for substitution of a different cross member being wider or narrower at said ends so that the over-all degree of arcuate movement of the windshield wiper arm may be varied to suit varying requirements of different motor vehicles. By this method and structure, a still further obstruction to universality of design and application of replacement windshield wiper motors of the vacuum type is substantially eliminated. It will be noted that the cross member may provide at the opposite sides of its end portions a different effective width, so that by reversing its position, a different over-all degree of arcuate movement of the windshield wiper arm may be provided.

A further object of the invention is to provide a throttling method and mechanism constructed and arranged so that, without alteration of such construction and arrangement, movement of the throttle from its median position in either direction will produce reversely a substantially identical performance of the driving vane of the motor.

Another object of the invention is to provide a valve assembly and mounting plate therefor, which may be assembled separately of the motor, may be installed in the complete motor assembly as a pre-assembled unit, and thus may be replaced independently of any other replacement, when and if for any reason required to be replaced.

Another object of the invention is to provide a novel construction and arrangement of parts and assembly whereby essential characteristics of parts may be readily attained by the use of conventional punch press equipment and processes, thus facilitating volume production. As an example, it is common practice to die cast the raceway and mounting frame in one piece. Besides limiting the raceway to die cast materials, which are less resistant to wear, this one-piece die cast member must be made in various sizes and shapes to meet the varying dimensions and locations of different mounting brackets to which such motor must be attached. This means the costly construction and maintenance of elaborate die casting dies in various shapes and sizes.

In the subject invention, the raceway housing 1 is drawn out of sheet metal, preferably aluminum, the frame 3 is formed separately and may be formed of a different metal such as stainless steel, to give greater strength than die cast material or aluminum. Thus, by making this assembly in two pieces a different material may be used in each piece, to obtain in each piece characteristics most desirable. The raceway housing is nested in the frame and is held in such frame by spot welding or riveting thereto or otherwise.

A number of important advantages are obtained through this novel two-piece construction and arrangement of raceway housing and frame. To meet the requirements of different locations of mountings it is only necessary to vary the dimensions of the frame. Thus all of the raceway housings of a given size or power category of the motor remain identical and their production may continue uninterrupted for die changes in the presses. This accomplishes substantial savings in cost because production runs of the raceway housing extend to the sum total of all of the motors to be manufactured in that power category.

The rate of wear in a frictional raceway such as is employed in the subject invention is influenced by the disposition of the grain of the metal toward the direction of travel of the vane, for example. By forming the raceway as herein described, the grain of the metal may be disposed at any desired angle and thus the durability of the raceway may be enhanced. Die cast metal is relatively porous and is without uniform grain.

Ordinary care in handling of materials for production and parts in production, provides a substantially smooth and uniform contact surface in the raceway, without applying a finishing operation. When the raceway housing is formed of aluminum, its interior frictional surfaces may be chromium-plated by well-known methods which give the raceway a flint-like hardness difficult even to scratch with a file. Thus the method and construction and arrangement herein described result in a motor raceway housing and frame assembly more desirable both from the standpoint of (1) facilitating volume production, and (2) increasing resistance to wear of critical parts.

It may be added that to attempt by punch press methods to form the raceway housing and frame integrally out of one blank would introduce serious problems of which no practicable solution has been found within permissible cost ranges. It will be noted that the top marginal edges of the raceway housing must be substantially uniform and true to permit a tight seal against the cover to prevent leakage under vacuum. The raceway housing which forms a part of the subject invention is readily held substantially true and uniform at edges to which such seal is required. Any attempt to form these two pieces integrally from a single blank would result in a comparatively irregular surface at the area of seal. Thus the degree of perfection of seal required for practical results could not be attained, even by subjecting the part to so large a number of operations as would make the cost of the part prohibitive.

It will be noted that the narrow top marginal edges of the raceway housing must conform accurately to that portion of the cover recessed for the purpose of receiving it in sealed relationship. In perfecting this seal, a thin gasket usually is employed.

Another object of the invention is to facilitate replacements where necessary, and to minimize their cost, by providing detachable subassemblies which are readily replaceable, such as the mounting block. It will be noted that on this block (which, on account of its various functions and multiple passages may be a die casting) carries the throttle valve and the valving assembly. By removing this one block with the throttle and the valving mechanism attached to it, substantially the entire functional structure of the invention may be replaced—or any of the three elements (throttle, valving mechanism or mounting block) may be replaced.

Another object of the invention is to provide an improved construction and arrangement of parking seals 51 and 52 by which the vacuum may be sealed against the inner surface of the cover 2 when the vane 12 is in parking position. It will be noted that two directly opposite resilient cup-like parking seals are mounted, one on either side of the vane, so that the vane may be parked at either end of its stroke and the wiper arms and blades may be parked correspondingly at either end of their stroke.

It is obvious that when the motor is made for original equipment of an automotive vehicle where all functional and dimensional requirements are predetermined, those structural and functional features of the invention introduced solely to provide universality may be omitted and their cost avoided. For example, only one vacuum seal would be required because the vane would park only at one predetermined end of its stroke. Only one hollow nipple is required, since the vacuum hose would approach always from a predetermined side.

The outer end of motor shaft 7 may be so constructed and arranged as to be readily adaptable to the type of linkage preferred for connecting it operatively to the wiper arm and blade.

Other objects and advantages of the invention will become apparent after the description hereinafter set forth is considered in conjunction with the drawings annexed hereto.

Referring to the drawings, wherein like parts are designated by the same numerals, Figure 1 is a diagrammatic view of an instrument panel assembly of an automotive vehicle exemplifying a unique valve control unit which may be installed in a plurality of various convenient positions, two of such positions being illustrated;

Figure 13 is a vertical section taken through an appropriate part to illustrate details of construction;

Figure 14 is a vertical section taken through an appropriate part of the assembly illustrating additional details;

Figure 15 is a top view of a part of the motor assembly illustrating a neutral position of the valve;

Figure 16 is a diagrammatic view illustrating two operating positions of the valve setup;

Figure 17 is a view similar to Figure 13 showing the manner in which parking of the wipers is obtained;

Figure 18 is a modified assembly of certain components showing a different way to obtain shorter strokes of the wiper arm; and Figure 19 is a perspective view of another embodiment of one of the components of the valve operating mechanism.

Figure 1:
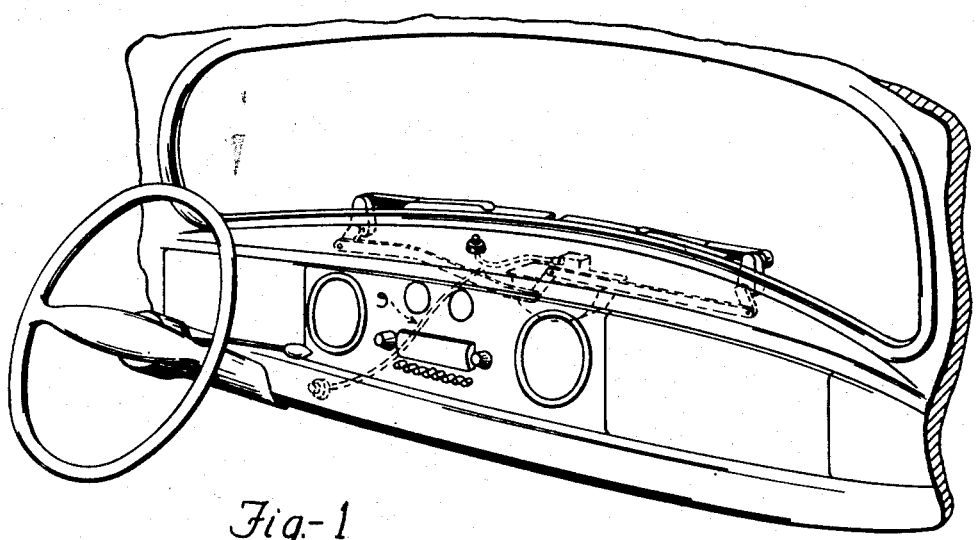

The motor structure exemplified in the drawings includes, among other things, a housing 1, a cover 2, a mounting frame 3 permanently secured to the housing, a valve body 4 detachably secured to the cover, a primary or throttle valve 5 carried by the valve body, mechanism or valving device 6 actuated by a driving shaft 7 for controlling a secondary valve 8, and a control unit 9 operatively connected to the primary valve.

The housing of the assembly may be designed and constructed as desired but, as herein illustrated, it is comprised of corresponding arcuate spaced apart parallel side walls 10 joined by a substantially semi-circular wall 11 to provide a chamber or raceway for a vane 12 clamped for rotation with the shaft 7. The junctions between the side and circular walls are curved as indicated at 13. The mounting frame and cover are each generally rectangular in shape, the frame 3 having an opening defined by an embracing flange 14. The arrangement is such that when the housing and bracket are permanently secured together such as by spot welds 15, the curved end portions of the flange will at least forcibly engage the housing and the upper marginal edges of the housing will lie in substantially the same plane as the upper planar surfaces of the mounting frame. More specifically in this respect, the convex side of the housing is pressed into the frame to temporarily hold the parts in a pre-assembled relationship, whereupon they are permanently united by any suitable fastening means.

Figure 5:
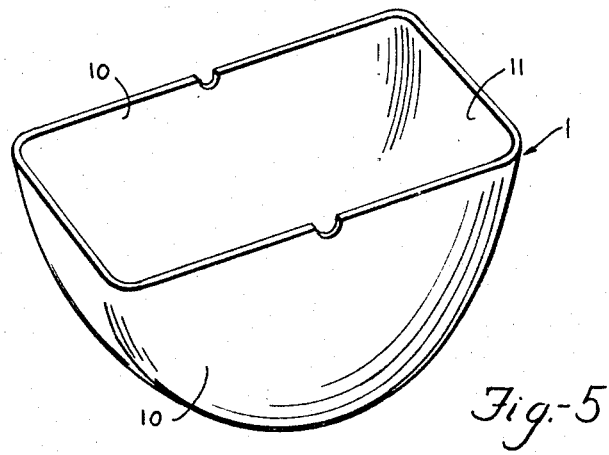

The sides of the frame are provided with concave seats 16 with tubular bearings 17 and 18 disposed therein for supporting the drive shaft 7. The bearing 17 is held in place by the valve body 4 and bearing 18 by a clamp 19, the latter being arranged within a notch 20 provided in the cover and directly connected to the frame by rivets 21. Clearance notches as illustrated in Figure 5 are provided in the side walls 10 of the housing for the shaft 7. The cover and mounting frame are preferably provided with ears 22 having aligned corresponding apertures through which bolts or other means may be extended to detachably mount the motor assembly on an appropriate part of the motor vehicle.

Figure 7:
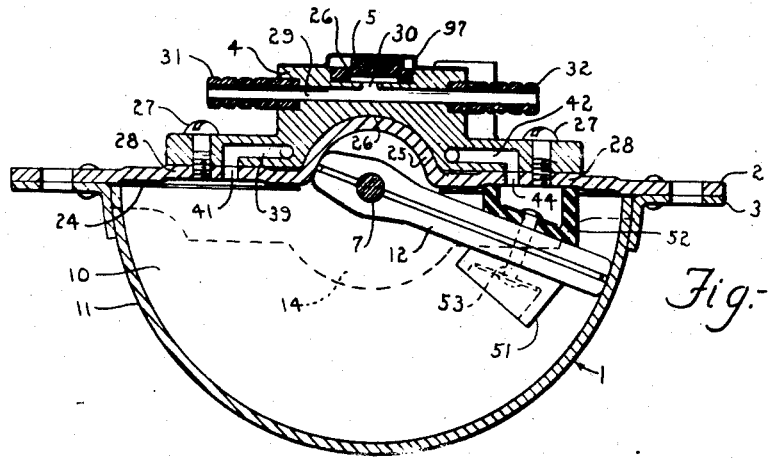
Figure 7 is a vertical section taken through an appropriate part of the motor assembly illustrated in Figure 6 showing various fluid passages and one position of the valve vane.
Figure 8:
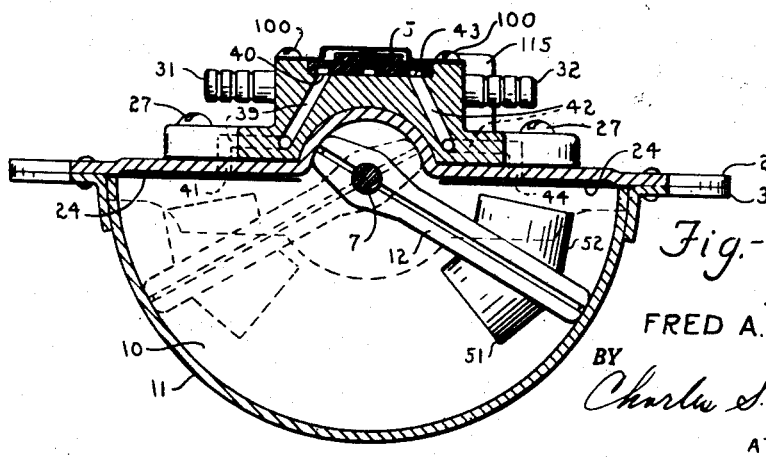
Figure 8 is a vertical section similar to Figure 6 showing other fluid passages and two different positions of the vane.

The frame and cover are preferably constructed of sheet metal and in order to insure a leak-proof raceway or chamber for the vane 12, the cover is preferably provided with a large rectangular recess 23 as illustrated in Figure 1, so that a gasket 24 with appropriate cut-outs can be clamped tightly between the upper marginal edges of the housing and the cover, as illustrated in Figures 7 and 8. The marginal edges of the gasket engage the marginal walls of the recess to retain the gasket in place. It will be noted that the cover is provided with a centrally disposed raised substantially semi-cylindrical portion 25 providing a smaller raceway or chamber for the upper part of the vane. In the present construction the housing, frame and cover are constructed of sheet aluminum, and consequently, from a practical standpoint, it is desirable to provide good hard travel surfaces resistant to wear for the vane. Although not essential, these hard surfaces in practise have been obtained by chromium plating.

The valve body 4 may be constructed as desired, but is preferably made in the form of a metal block provided with a substantially semi-cylindrical recess 26 of a size to snugly receive the cylindrical portion 25 formed on the cover, as exemplified in Figure 7. The ear ends of the valve body are preferably secured by screws 27 to circular bosses 28 formed on the cover. With this arrangement, the block or valve body is firmly anchored to the cover.

It is essential that the cover be maintained in a true or rigid condition so that the gasket 24 will intimately engage and properly seat against the upper marginal edges of the housing and the rectangular recess 23. Rigidity and stability is imparted to the cover at least in part by the cylindrical portion 25, rectangular recess 23 and the circular bosses 28.

The upper part of the valve block is provided with a circular recess 26, which rotatably receives the throttle or primary valve 5 above referred to. As will be pointed out hereinafter, the valve block is provided with a plurality of passages leading to the chamber or raceway and to a secondary valve 8. The manual control unit 9 serves to actuate the throttle valve to control the operation of the motor. Parking of the wipers is also accomplished by proper manipulation of the control unit as will be pointed out hereinafter.

Figure 2:
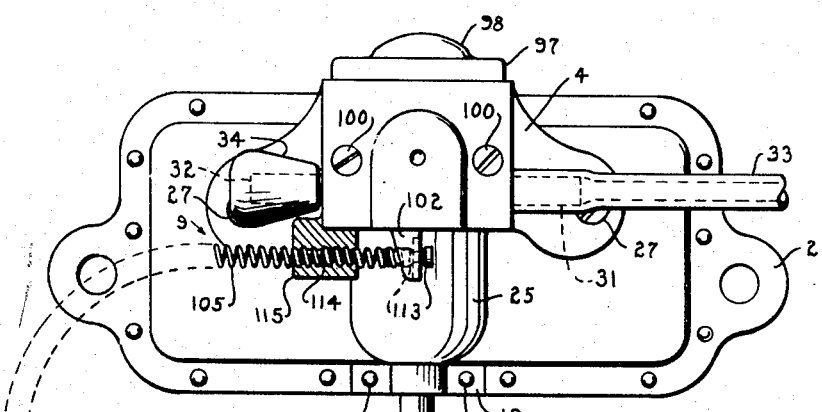
Figure 2 is a top view of a vacuum type windshield motor showing the valve control assembly operatively associated therewith.
Figure 3:
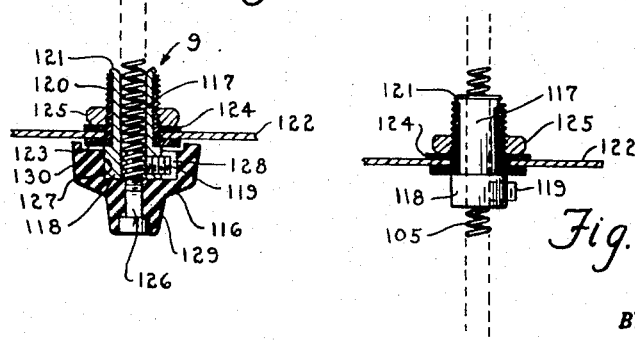
Figure 3 is a view showing a component of the control unit.
Figure 4:
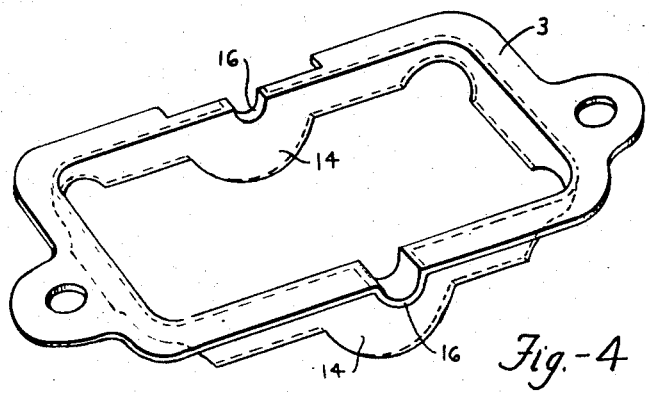
Figures 4 and 5 illustrate perspective views of the motor housing and mounting frame.

The unique arrangement of the various passages in the valve body or block will now be considered. The block is provided with a longitudial passage 29, the midpoint of which is interrupted by a vertical passage 30 leading to the circular recess 26. The opposite ends of the longitudinal passage are preferably enlarged to receive nipples 31 and 32 in order that a flexible conduit may be connected to either of the nipples in the manner above described. More specifically in this respect, if the installation requires that the conduit 33 extending from the source of suction be connected to nipple 31, the other nipple 32 may be closed by a detachable rubber cap 34 as shown in Figure 2, and vice versa.

The block is provided with a vertical passage 35, one end of which communicates with the circular recess 26 at a port 36 diametrically opposite the vertical passage 30, and its other end connects with a hole 37 provided in a mounting plate 38 for the mechanism 6. The block is also provided with a passage 39, one end of which communicates with the circular recess 26 at port 40 and its other end communicates with the chamber or raceway through an opening 41 provided in the boss 28 of the cover 2. A passageway 42, similar to passageway 39, communicates with the circular recess 26 at port 43 and an opening 44 provided in the other boss 28.

The valve block is further provided with a passageway 45, one end of which communicates with the circular recess 26 at a port 46, and its other end with an aperture 47 provided in the mounting plate 38 and spaced apart from the hole 37. A passageway 48, similar to passageway 45, communicates with the throttle valve recess at a port 49 and an aperture 50 provided in the plate 38 and spaced apart from the hole 37, the hole 37 and apertures 47 and 50 being operatively related to the secondary valve 8.

Cup-like resilient seals 51 and 52 are secured to the opposite sides of the vane 12 by a single fastening means 53. Attention is directed to the fact that the cross-sectional dimension of each seal is somewhat less than the diameter of the bosses 28 formed on the cover 2 so that, for example, the end of each seal will engage the under flat surface of boss 28 to close the opening 41 provided in the cover at one side of the vane, and the corresponding edge of the other seal will similarly engage a boss to close the opening 44.

The mechanism 6 carried by the mounting plate 38 embodies improved principles of design and construction and will now be described. The mounting plate 38 and mechanism 6 are preferably associated together to constitute a subassembly which may be readily detachably connected to the motor block by screws 54. As illustrated in Figure 14, the valve block is preferably recessed at 55 and the cover and frame with similar recesses to receive the upper extremity of the mounting plate 38. With this arrangement, the subassembly is firmly interlocked with the valve block. This is important from the standpoint of maintaining the hole 37 and apertures 47 and 50 in the mounting plate in registry with the passageways 35, 45 and 46, respectively.

The mounting plate is provided with an aperture which receives the shaft bearing 17. Pivots 56 extend transversely through the mounting plate 38 and pivotally support a pair of corresponding rocker arms 57 and 58 for maintaining a cam member 59, rotatable on the shaft 7, in predetermined rotative positions in order that the fluid intended to circulate through certain of the passages will not be interrupted except at predetermined intervals. Washers 60 carried by the pivots are arranged between the plate and rocker arms. This cam member may be constructed as desired, but is preferably made by stamping same out of sheet metal stock, and includes a hub portion 62 and end extremities of substantially arrowhead or nose-like design. These extremities are provided with rearwardly extending walls to form generally V-shaped cams 63 and 64. The upper ends of the rocker arms 57 and 58 are continuously yieldably urged into engagement with the cams 63 and 64 by a helical expansible spring 65 carried by lugs 66 on the lower ends of the arms. The upper end of the rocker arm 57 is provided with a notch 67, an abutment 68, a crest 69 between notch 67 and abutment 68, and an abutment 70 adjacent the pivot 58. The rocker arm 58 is similarly provided with a notch 71, a crest 72 and abutments 73 and 74.

An elongated oscillating member 75 carrying the secondary valve 8 is also rotatably mounted on the motor drive shaft 7. This oscillating member is provided with an upper head portion having an arcuate slot 76 therein which loosely receives the valve 8. The body of the valve is of hollow construction and includes a flange 77 which is disposed between the oscillating member and the front face of the mounting plate in order to present escape of the valve. This valve is operable to alternately place the hole 37 of the mounting plate in communication with first one and then the other of the openings 47 and 50 as illustrated in Figure 16.

The oscillating member is provided with notches 78 and 79 adjacent the head portion and its other extremity or tail portion is provided with a pair of spaced abutments 80 and 81 on one side of such portion, and abutments 82 and 83 on the other side. A fiber washer 84 is interposed between the mounting plate and the oscillating member and a fiber washer 85 between the oscillating member and the cam. The front wall at one end of the cam member 59 is provided with a pair of notches 86 and 87, and a pair of corresponding notches 88 and 89 at its other end.

An elongated key member 90 is disposed in a slot 91 provided adjacent the inner end of the drive shaft 7. This key member is provided with a small notch 92 to receive the shaft and a larger notch 93 receiving the hub 62 of the cam member and a metal friction washer 94. This washer is comprised of a suitable material to provide a smooth bearing surface for the key. Inturned lugs 95 and 96 are provided at the ends of the key. It will be noted that the key member 90 is arranged in the same plane as the vane 12.

Figure 6:
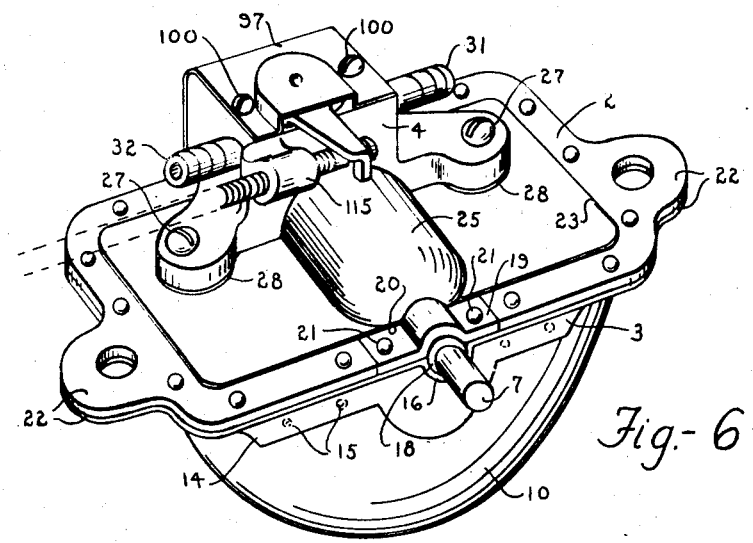
Figure 6 is a perspective view of the motor assembly.

A shroud or shield 97 of unique design and construction is provided for mechanism 6 and the throttle valve 5. Its depending front wall portion 98 is secured to the lower end of the mounting plate by screws 99 and its top horizontal portion to the valve block with screws 100. The front wall 98 is adapted to engage the slotted rear end of the shaft so as to retain the key member 90 in the slot and the top portion 98 is adapted to engage the throttle valve and hold it within the circular recess 26 provided in the valve block as illustrated in Figures 6 and 13. If found desirable, the shroud may be fashioned so that it can be snapped into place with portions yieldably engaging the shaft and throttle valve.

The primary valve 5 may be constructed in various ways but as herein illustrated, includes a round portion 101 which is seated in the recess 26 and a lateral finger portion 102 having a tab 103, the latter being provided with an opening which is adapted to receive a connector 104 attached to the inner end of a helical flexible control member 105 constituting a component of the manual control unit 9.

The underside of the throttle valve 5 is provided with a recess of generally T-shaped formation which includes a circumferentially disposed recess 106 communicatively connected with a diametrical recess 107. The valve is further provided with a pair of circumferentially arranged recesses 108 and 109 disposed on opposite sides of the diametrical recess 107. Attention is directed to the fact that the T-shaped recess is at all times in communication with the vertical passage 30 leading to the vacuum means. The operative relationship of these recesses to the various ports or passages entering the circular recess 26 will be described more in detail subsequently.

The opening in the tab 103 includes a slot 110 and an entrance notch 111 intersecting the slot so that the reduced portion 112 of the connector 104 may be received in the slot and the tab 103 will be held between abutments 113 provided on the connector. With this arrangement, a detachable easily workable coupling or connection is established between the flexible control member 105 and the tab 103 of the primary valve 5. The connector 104 is preferably of a diameter not in excess of the diameter of the flexible member 105 in order that the connector will pass through a threaded aperture 114 formed in an offset 115 integral with the valve block 4. The flexible member threadedly engages the threaded aperture 114 and is of such a character that a knob 116 adjacent its outer end may be disposed in any location on the instrument panel desired for convenient operation, for example, at the top or front as illustrated in Figure 1 of the drawing.

The outer end of the flexible member as herein illustrated preferably carries a tubular bushing 117 having an enlarged end 118 provided with a set screw 119 for detachably securing the bushing to the flexible member. A flanged exteriorly threaded bearing 120 is secured to the reduced portion of the bushing by flaring outwardly the inner end of the bushing at 121 in a manner to permit relative rotation between the bushing and bearing. The bushing and bearing are adapted to extend through an aperture provided therefor in an instrument panel 122 with the flange 123 of the bearing engaging the front surface of the panel. A washer 124 engages the rear side, and a nut 125 engages the bearing to lock the parts to the panel. The knob 116 is secured to the enlarged portion 118 of the bushing by means of a screw 126 which extends axially through the knob and is threadedly received in the threads formed by the flexible member 105. An annular recess 127 in the knob is enlarged at 128 in order that the set screw 119 may extend therein to further make certain that the knob will rotate with the bushing. The knob is provided with a pair of knurled annular portions 129 and 130, one of which is larger than the other. With this arrangement, it will be evident that the flexible member may be rotated more rapidly by fingering the smaller knurled portion 129 than when the larger portion is engaged.

The manual control unit 9 provides means whereby the throttle or primary valve 5 may be accurately controlled to govern the operation of the motor. The operation of the motor and parking features thereof are comparatively simple and will now be described.

As stated above, the generally T-shaped recess formed in the under side of the throttle valve 5 includes a circumferential recess 106 and a diametrical recess 107. These recesses are at all times in communication with the vacuum means through vertical passage 30 and longitudinal passage 29 formed in the valve body or block 4. When the throttle valve 5, secondary valve 8 and the various components of the mechanism 6, including the vane 12 are in the positions illustrated in Figures 7 and 17, the motor shaft will be held against movement to operate a wiper arm and blade, this being due to the fact that the diametrical recess 107 is not connected with the port 36 in the motor block leading to the hole 37 in the mounting plate through passage 35, and when the secondary valve is carried over to the position illustrated, the passages 39, 45, 35 and 48 will be vented to the atmosphere through the aperture 50 in the mounting plate so that vacuum is created through opening 44. More specifically, when the throttle valve 5 is in such position, the circumferential recess 106 will be placed in communication with the port 43 which connects with opening 44 in cover 2 through passage 42, all of which will cause the cup seal 52 to be drawn intimately against the boss 28 and thereby maintain the motor shaft 7, and the wiper arm and blade operatively connected thereto, in a parking position until the valve 5 is moved to place diametrical slot 107 in communication with port 36 as illustrated in Figures 15 and 16. The cup seal 52 also serves to prevent seepage of air from the raceway or chamber into the opening 44 and further acts to cushion the parking stroke of the vane.

Figure 9:
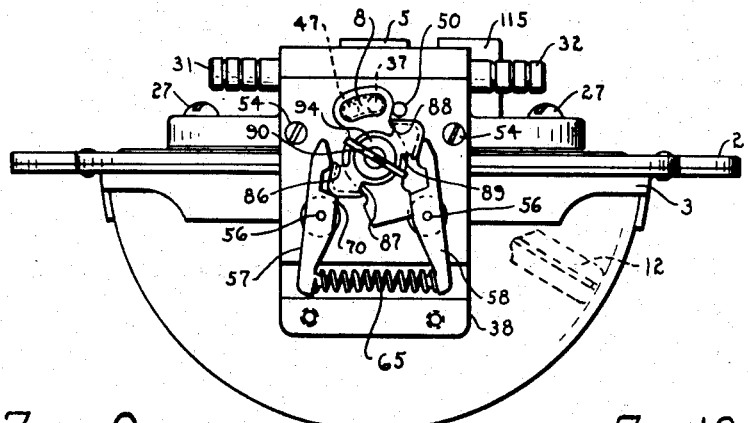
Figures 9, 10 and 11 are rear views of the motor assembly with certain parts removed to exemplify various operating positions of an improved valve operating mechanism.

Moreover, it will be noted that when the vane is in the parked position just described or as illustrated in Figure 9, the cam 63 of member 59 will be caught in the notch 67 of rocker arm 57 and cam 64 will be disposed between notch 79 on the head portion of oscillating member 75, and the abutment 73 on the upper end of rocker arm 58, and that abutment 83 on the tail portion of the oscillating member will engage the abutment 74 on this rocker arm. Whenever the throttle valve is moved by the manual control unit 9 so that the diametrical recess 107 takes a position opposite to that illustrated in Figure 17, with such recess located between ports 36 and 49 in the valve block, the seal 51 on vane 12 will be drawn against the other boss 28 to close the opening 41 provided in the cover 2 so that depending on the hook-up or installation of the motor the vane will be parked in a position directly opposite to that illustrated in Figure 7. When so parked the aperture 47 in the mounting plate will be exposed to the atmosphere and passage 39 connected to opening 41 in the cover and port 40 in the block will be placed in communication with the vacuum through circumferential recess 106 which is at all times connected to vertical passage 30 leading to the vacuum.

Also the cam member and oscillating member will assume reversed positions with the cam 64 in notch 71 of rocker arm 58, cam 63 bearing on abutment 68 at the upper end of rocker arm 57, notches 86 and 89 on the cam member respectively engaging notch 78 and abutment 82 on the oscillating member 75, and the abutment 83 on the oscillating member bearing against abutment 74 on the rocker member 58.

Figure 10:
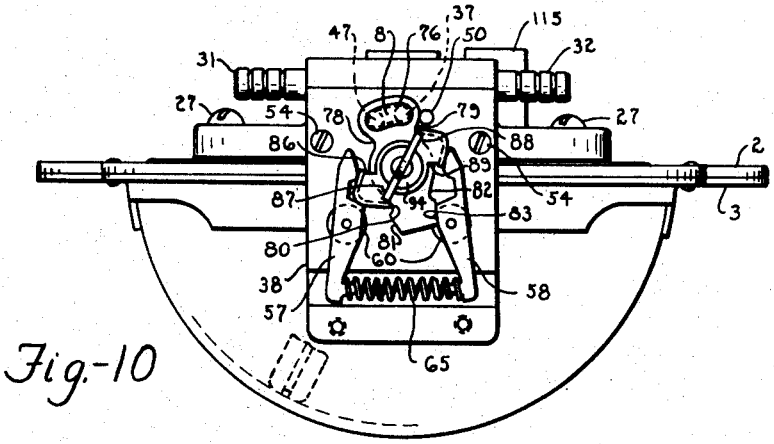
Figure 11:
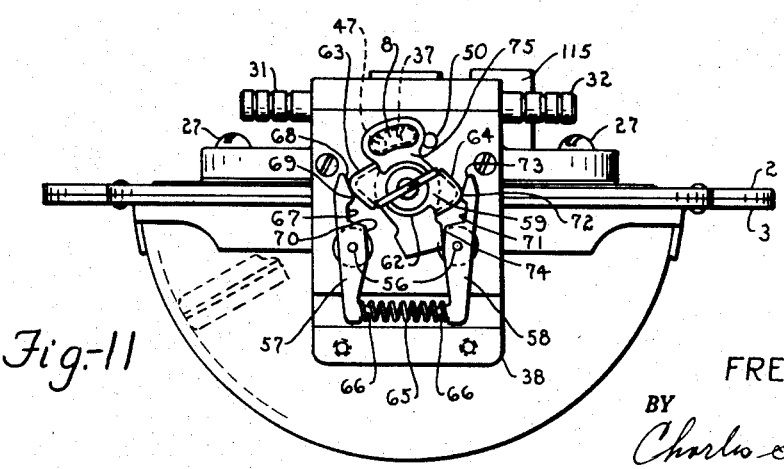
Figure 12:
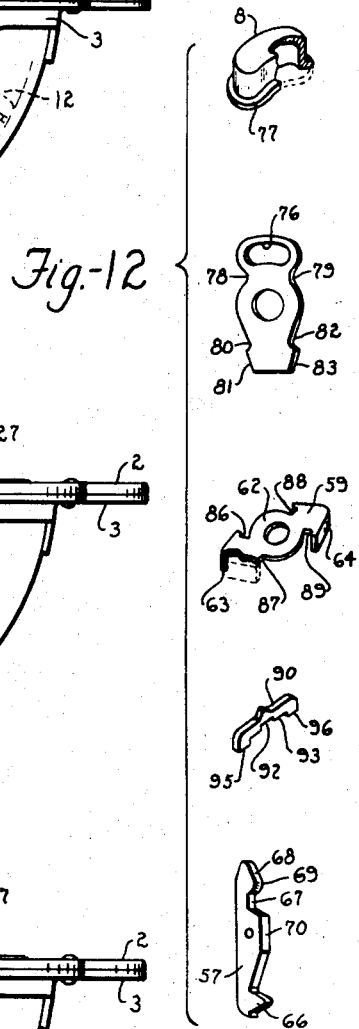
Figure 12 is a view showing various components of the valve operating mechanism.

To operate the motor, the throttle valve 5 is rotated to the position illustrated in Figures 15 and 16 by the flexible member 105 to connect the diametrical recess 107, which is at all times in communication with the vacuum, with port 36 which leads to hole 37 in the mounting plate through passage 35, thereby connecting the secondary valve 8 with hole 37 and aperture 47 in the mounting plate, aperture 47 with port 46 through passageway 45, port 46 to port 40 through recess 108 in the valve, and port 40 to opening 41 in the cover 2 through passageway 39, to establish a through line of communication from passage 30 to secondary valve 8 and opening 41 to cause the vane 12, previously in the parked position in Figure 7, to be sucked to the left as exemplified by the dotted lines in Figures 8, 10 and 11. The moment the secondary valve 8 is moved over hole 37 and aperture 50 in the mounting plate, opening 44 in the cover is placed in communication with the vacuum to cause the vane to move back to the right as indicated in Figure 8. More particularly in this respect, communication is established between opening 44 and port 43 through passageway 42, port 42 to port 49 through recess 109 in valve 5, port 49 to aperture 50 through passageway 48, aperture 50 to hole 37 through valve 8, hole 37 to port 36 through passageway 35, and port 36 to vertical passage 30 and the vacuum through diametrical recess 107. As the vane moves further to the right, the lugs 96 and 95 and the key 90 will respectively engage the notches 89 and 86 on the cam member 59 causing the cam member to move with the shaft and cams 63 and 64 to again engage the crests 69 and 72 on the rocker arms and, just before the vane completes its stroke the cam member will snap in a counterclockwise direction causing cams 64 and 63 to simultaneously respectively strike against notches 79 and abutment 82 on the oscillating member to cause the oscillating member to assume a position directly opposite to that in Figure 9 and so that the cams and oscillating member will engage the rocker arms in the same manner as stated above when the vane is parked to the left side of the housing chamber or raceway.

When the throttle valve is in the position illustrated in Figures 15 and 16, the vane will be caused to automatically oscillate within the chamber to actuate the drive shaft 7. It is of course to be understood, that when the valve is in the position just referred to, the shaft will be oscillating at its maximum speed. To reduce the rate of oscillation, it is merely necessary to move the throttle valve 5 in a direction to reduce the strength of the suction at the openings 41 and 44 provided on the cover of the motor.

As the vane moves to the left as illustrated in Figure 10, the lugs 95 and 96 on the key 90 will respectively engage the notches 87 and 88 on the cam member 59 to force the cam member to rotate with the shaft 7 and cause the cams 63 and 64 to engage the crests 69 and 72 on the spring pressed rocker arms 57 and 58, and just before the vane completes its final upward stroke as illustrated in Figures 8 and 11, the cam member 59 will be caused to snap in a clockwise direction to cause the notches 86 and 89 on the cam member to respectively engage the notch 78 on the head portion of the oscillating member 75 and abutment 82 on the tail portion thereof, and flip the oscillating member over so that the secondary valve 8 will communicate with hole 37 and aperture 50 provided in the mounting plate, exposing aperture 47 to the atmosphere.

Attention is directed to the fact that since the secondary valve 8 is in communication with the vacuum, it will be drawn toward the mounting plate and its flange 77 will act as a seal as it slides over the outer face of the mounting plate.

As exemplified in Figure 18 of the drawing, the construction may be modified to reduce the travel of the drive shaft 7. This may be accomplished in various ways, but as illustrated in Figure 18, a key 200 of a length somewhat greater than key 90 is provided. This key 200 is provided with suitable lugs (not shown) which are adapted to engage the cams 63 and 64 at the points illustrated, which points are spaced a greater radial distance from the axis of shaft 7 than are the notches 86 through 89. With this arrangement the secondary valve 8 will be shifted more frequently as there is less lost motion occurring between the cam member and key. Such frequency in turn controls the arcuate length of the vane travel.

In Figure 19 there is illustrated a key member 300 which may be substituted for either of the keys 90 and 200, thereby providing an additional way to reduce the travel arc of the vane. Thus it would be apparent that keys of different forms can be used to obtain a predetermined travel of the vane to meet various requirements.

Having thus described my invention, it is obvious that various modifications may be made in the same without departing from the spirit of the invention, and, therefore, I do not wish to be understood as limiting myself to the exact forms, constructions, arrangements, and combinations of parts herein shown and described and defined in the claims.

I claim:

1. A windshield wiper motor comprising a housing, a cover secured to the housing, a throttle valve body carried by the cover, a valve in the body, a manual control for the valve, a mounting plate carried by said valve body, a shaft having a portion supporting a vane in the housing and having a portion extending through the mounting plate, valve operating mechanism mounted on the plate, a secondary valve structure mounted on the shaft and actuable by said mechanism, passageways provided in the valve body leading to the throttle and secondary valve, a driver mounted on the shaft for holding the secondary valve structure on the shaft, and a single member engaging the driver and the throttle valve for holding the same in place.

2. A fluid motor comprising a chambered housing, a cover for said housing, a shaft having a portion in the housing carrying a vane and a portion extending therefrom, a valve body mounted on the cover, a recess in the body, a throttle valve disposed in the recess, secondary valve operating mechanism having a part engaging the extended portion of the shaft for holding the mechanism thereto, and a member for holding the throttle valve in its recess and the said part engaged with said shaft.

3. A windshield wiper motor body, a throttle valve carried by the body, a control for the valve, a shaft supporting a vane for movement in the body, a secondary valve, means carried by the shaft assisting to actuate the secondary valve, passageways provided in the body and leading to the throttle and secondary valve, a fitting mounted on the shaft, and a single member cooperable with the fitting and the throttle valve for holding the same in place.

4. A windshield wiper motor body, a throttle valve carried by the body, a control for the valve, a mounting plate carried by the body, a shaft supporting a vane for movement in the body, a secondary valve, means jointly carried by the shaft and mounting plate assisting to actuate the secondary valve, passageways provided in the body and leading to the throttle and secondary valve, a fitting mounted on the shaft, and a single member cooperable with the fitting and the throttle valve for holding the same in place.

5. A windshield wiper motor comprising a housing, a cover secured to the housing, a throttle valve body carried by the cover, a valve in the body, a manual control for the valve, a mounting plate carried by said valve body, a shaft having a portion supporting a vane in the housing and having a portion extending through the mounting plate, valve operating mechanism mounted on the plate, a secondary valve structure mounted on the shaft and actuable by said mechanism, passageways provided in the valve body leading to the throttle and secondary valve, a driver mounted on the shaft for holding the secondary valve structure on the shaft, and cover means engaging the driver and the throttle valve for holding the same in place.

6. A windshield wiper motor body, a throttle valve carried by the body, a control for the valve, a mounting plate carried by the body, a shaft supporting a vane for movement in the body, a secondary valve, means jointly carried by the shaft and mounting plate assisting to actuate the secondary valve, passageways provided in the body and leading to the throttle and secondary valve, a fitting mounted on the shaft, and cover means cooperable with the fitting and the throttle valve for holding the same in place.

References Cited in the file of this patent

UNITED STATES PATENTS

| Number | Name | Date |
|---|---|---|
| 432,540 | Maurice | July 22, 1890 |
| 1,116,975 | Bergesen | Nov. 10, 1914 |
| 1,483,430 | Greensmith | Feb. 12, 1924 |
| 1,717,700 | Lippert | June 18, 1929 |
| 1,853,758 | Brumm | Apr. 12, 1932 |
| 1,978,634 | Hueber | Oct. 30, 1934 |
| 2,055,445 | Paulus | Sept. 22, 1936 |
| 2,075,959 | Previti | Apr. 6, 1937 |
| 2,129,942 | Kritz | Sept. 13, 1938 |
| 2,165,180 | Horton | July 4, 1939 |
| 2,186,657 | Saussure | Jan. 9, 1940 |
| 2,197,284 | Wooster | Apr. 16, 1940 |
| 2,298,734 | Buchmann | Oct. 13, 1942 |
| 2,302,109 | Dodge | Nov. 17, 1942 |
| 2,302,158 | Van Vulphen | Nov. 17, 1942 |
| 2,322,963 | Horton | June 29, 1943 |
| 2,344,913 | Ager | Mar. 21, 1944 |
| 2,348,492 | O'Shei | May 9, 1944 |
| 2,393,204 | Taylor | Jan. 15, 1946 |
| 2,407,840 | Leonard | Sept. 17, 1946 |
| 2,438,380 | Arens | Mar. 23, 1948 |
| 2,441,719 | Potter | May 18, 1948 |
| 2,521,566 | Carey | Sept. 5, 1950 |
| 2,602,430 | Bell | July 8, 1952 |

FOREIGN PATENTS

| Number | Country | Date |
|---|---|---|
| 697,976 | France | Nov. 5, 1930 |